United States Patent [19]
Matzek

[11] 3,737,562
[45] June 5, 1973

[54] TELEVISION DRIVE CONTROL CIRCUIT

[75] Inventor: Lester Tucker Matzek, Lombard, Ill.

[73] Assignee: Warwick Electronics Inc., Chicago, Ill.

[22] Filed: Mar. 18, 1971

[21] Appl. No.: 125,565

[52] U.S. Cl. ............................178/5.4 R, 178/7.3 DC
[51] Int. Cl. ............................H04n 9/18, H04n 9/48
[58] Field of Search ...................178/5.4 TE, 7.3 DC, 178/7.5 DC, 5.4 R

[56] References Cited

UNITED STATES PATENTS

| | | | |
|---|---|---|---|
| 3,541,242 | 11/1970 | Hall et al. | 178/5.4 R |
| 3,586,766 | 6/1971 | Hewer et al. | 178/5.4 TE |
| 3,324,236 | 6/1967 | Dietch et al. | 178/5.4 R |
| 3,457,362 | 7/1969 | Mackey et al. | 178/5.4 R |

*Primary Examiner*—Robert L. Richardson
*Attorney*—Hofgren, Wegner, Allen, Stellman & McCord

[57] ABSTRACT

A drive control for a television CRT includes a reference circuit which establishes a constant black level drive current regardless of the adjustment of a variable resistor which controls the gain of a drive stage. A set-up switch when actuated establishes the same constant black level drive current so that the grid bias of the CRT can be adjusted to set a black level on the CRT screen. When used in a color television receiver, the reference circuit may include a single adjustable control for varying the relative red/blue drive. An automatic color temperature control activated by the color killer interconnects the red and green color drive channels to the reference circuit to change the screen color temperature without changing the black level.

22 Claims, 4 Drawing Figures

Figure 1:
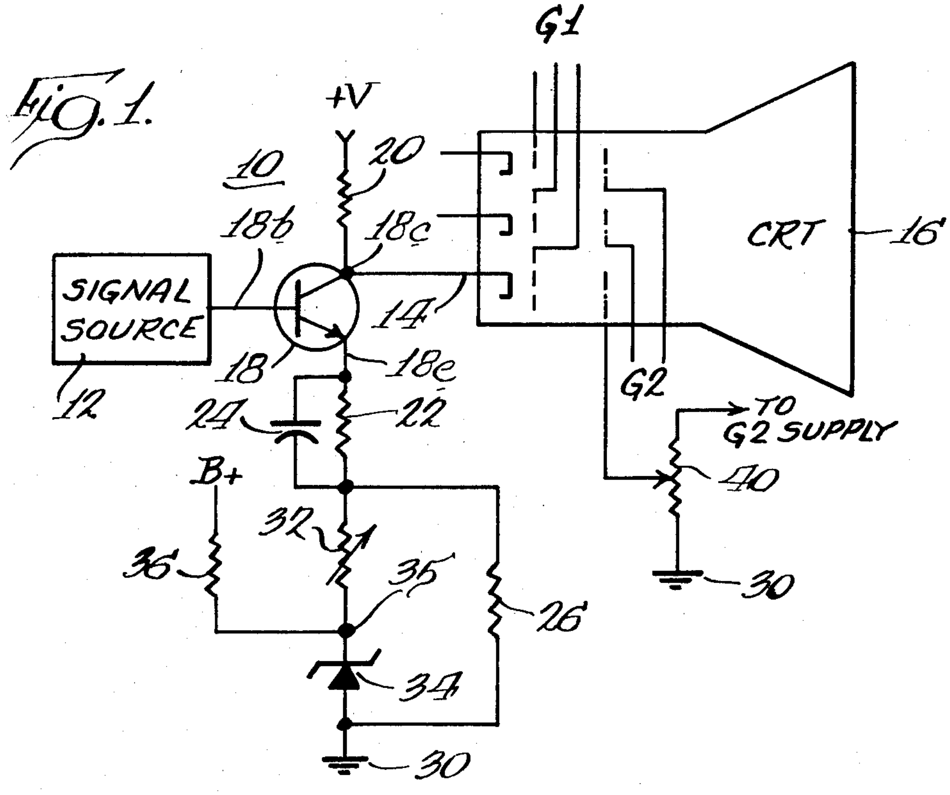

Inventor:
Lester Tucker Matzek
By Hofgren, Wegner, Allen, Stellman & McCord
Attys

TELEVISION DRIVE CONTROL CIRCUIT

This invention relates to an improved drive control circuit for a television receiver, and more particularly to a drive control circuit which maintains a constant black level regardless of the adjustment of a gain controlling potentiometer.

Typically, the drive stage which drives the cathode of a television cathode ray tube (CRT) includes a variable potentiometer connected to control the gain of the drive stage. One grid of the CRT is connected to a variable voltage or bias source in order to set a black level on the CRT screen when no signal is being received by the television receiver. When the gain potentiometer is thereafter adjusted, the change in resistance changes the current in the drive stage, thereby undesirably shifting the black level to a different point. As a result, the grid bias must be readjusted to reestablish the black level for the new setting of the gain control potentiometer.

In a color television receiver, the interaction between the black level grid bias adjustment and the three drive controls for the red (R), blue (B), and green (G) guns of the CRT is especially troublesome. Automatic adjustment of the color CRT screen temperature when switching between black and white or color reception undesirably shifts the black level.

Prior drive control circuits have other disadvantages. When a transistor drive amplifier is utilized, for example, black level may be set when the transistor is not forward biased. However, transistors have a nonlinearly region near cut-off, resulting in an undesirable nonlinear transfer characteristic for the drive stage when operating near black level. Also, no safety margin is provided in that the transistor cut-off point may change with time, as may the CRT cut-off voltage.

Relative color controls which adjusted the relative R/B typically were connected to vary the relative bias on the R and B grids of the CRT, also resulting in a shift in the black level.

In accordance with the present invention, an improved drive control usable in either black and white and/or color television receivers includes an adjustable gain control which has zero effect on a predetermined constant reference black level. By shunting current around the gain control, it is possible to maintain one output current level unchanged regardless of the resistance of the gain control. The unchanged current level is selected as the reference black level during a set-up procedure. The unchanged black level is near but not at cut-off of the drive stage, thereby providing a safety factor insuring that the CRT can always be cut-off. When used in a color television receiver, the improved drive control circuit allows automatic color temperature adjustment for black and white and color reception without changing the black level current. The circuit can also be incorporated in an improved relative color control for simultaneously adjusting in an inverse manner the gain of two color channels without affecting the black level.

One object of this invention is the provision of an improved drive control circuit having a gain control which is adjustable without affecting a predetermined reference level.

Another object of this invention is the provision of an improved color television receiver with relatively adjustable color drive controls which do not change the black level initially preset for the picture tube.

Figure 3:
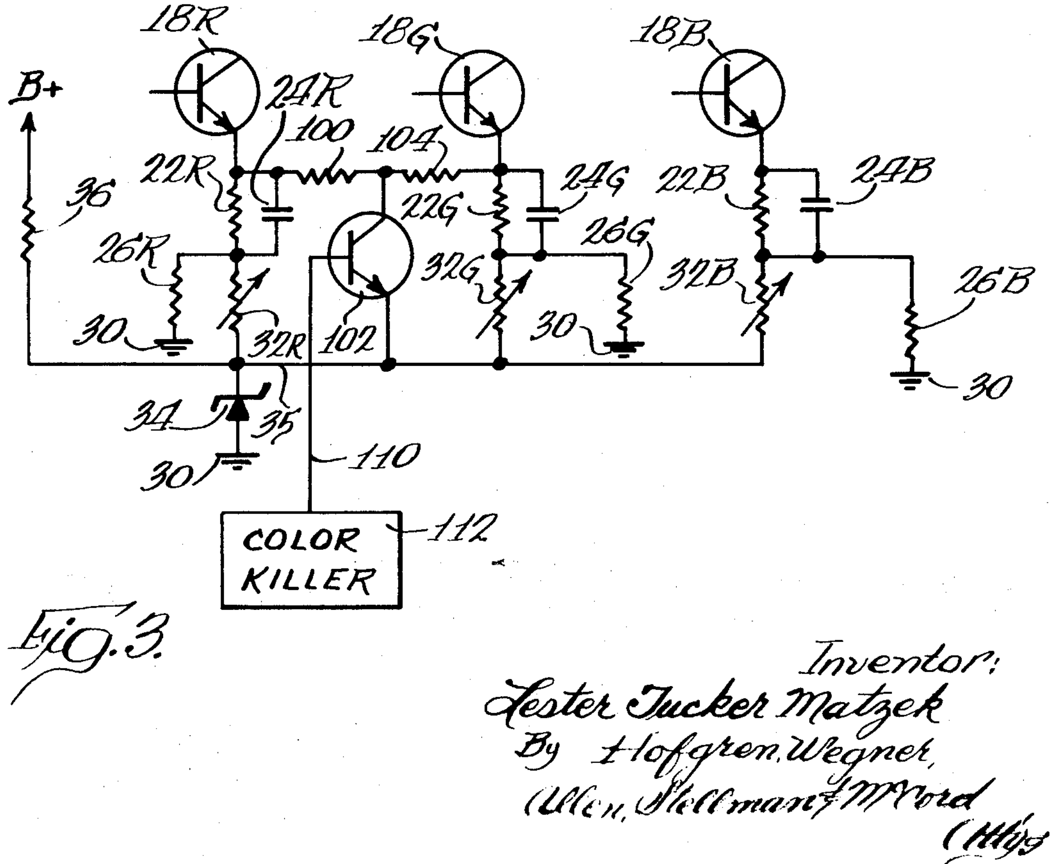
Figure 2A:
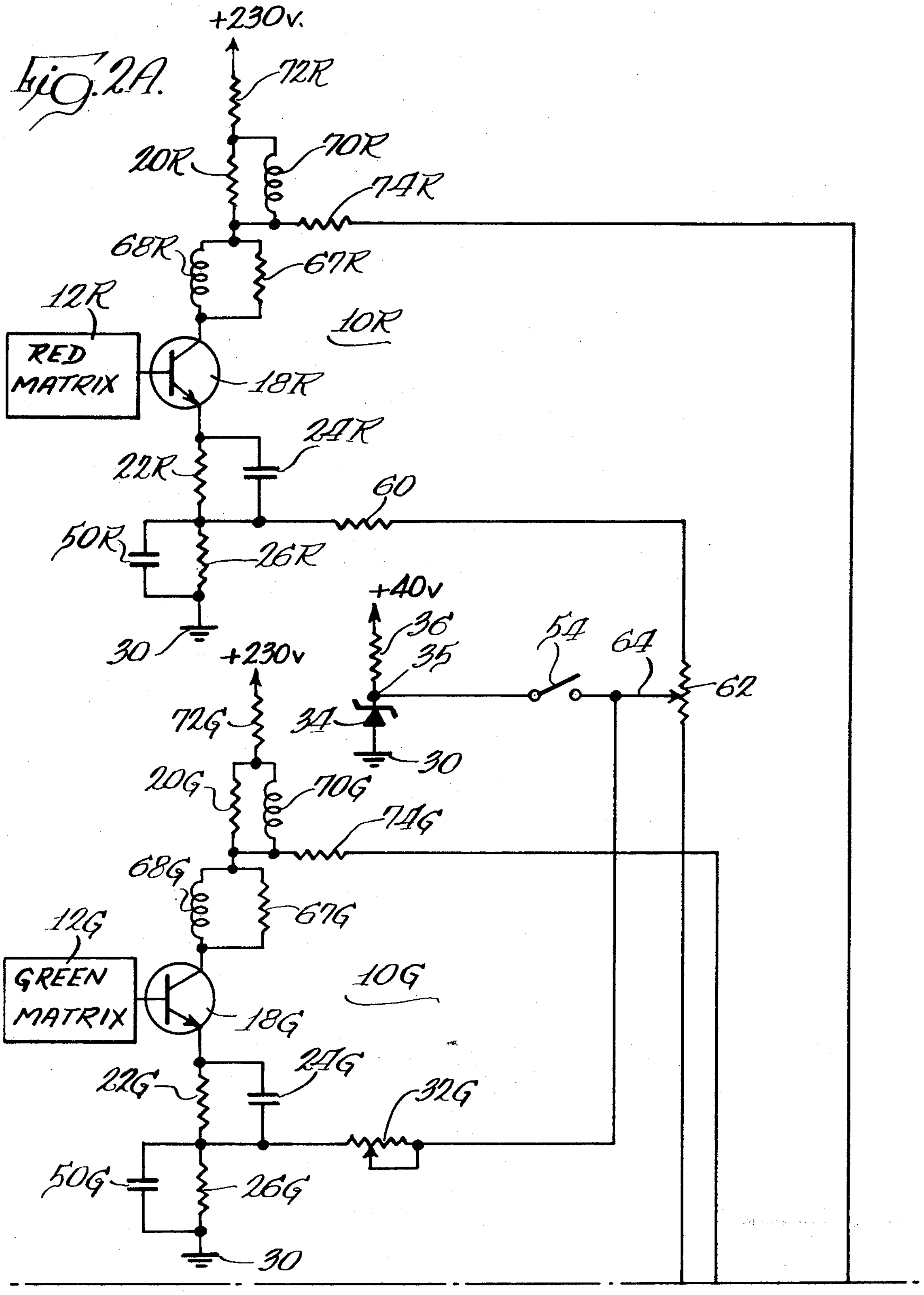
Figure 2B:
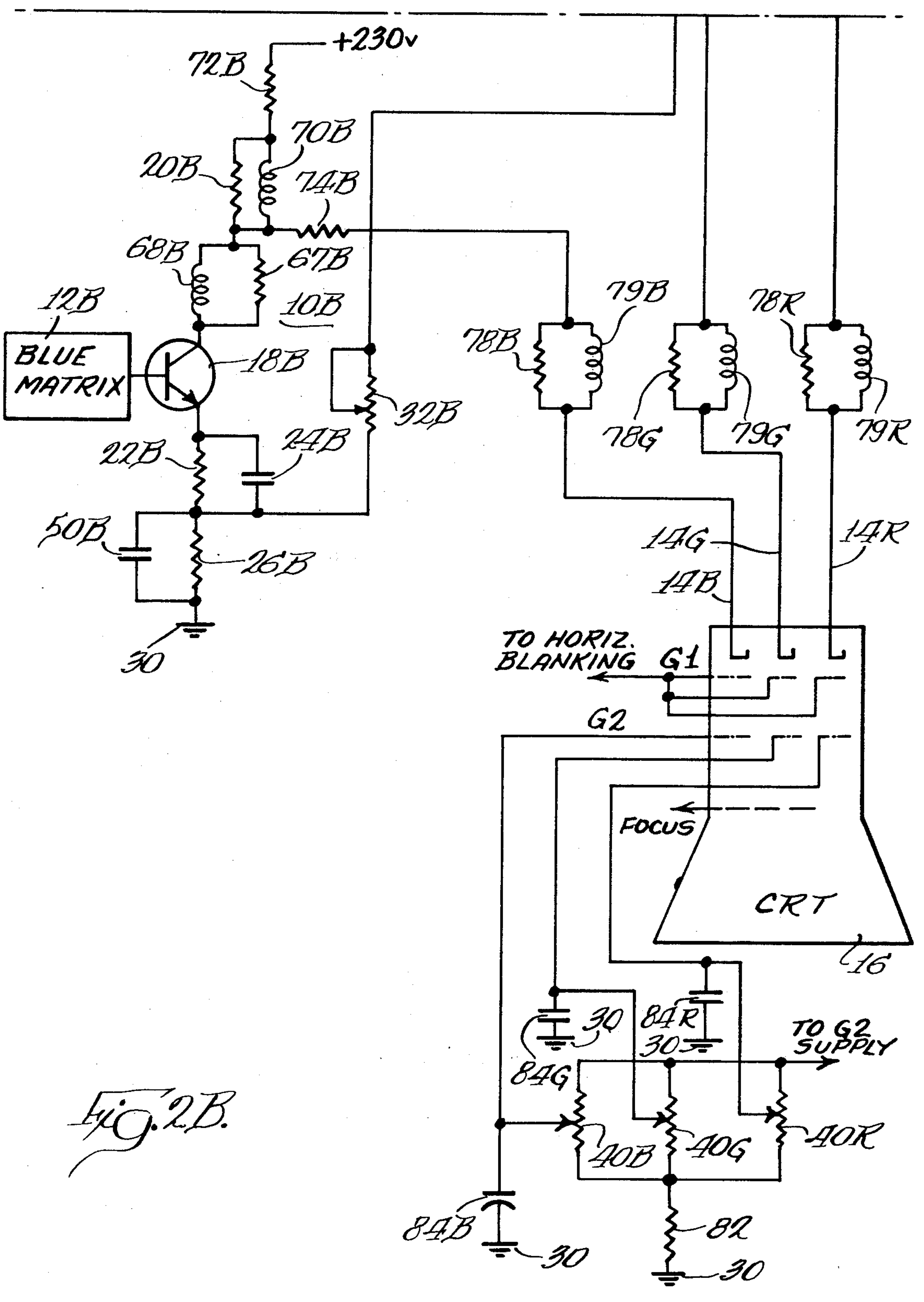

Further advantages and features of the invention will be apparent from the following description, and from the drawings, in which:

FIG. 1 is a schematic diagram of a drive control circuit for either a black and white or color television receiver, and is exemplary illustrated in a color television receiver;

FIGS. 2A and 2B are a schematic diagram of three color drive control circuits utilizing the principles of the circuit of FIG. 1 and further including an improved set-up circuit and procedure and an improved relative color control; and FIG. 3 is a schematic diagram of a modification for FIGS. 2A and 2B, illustrating the addition of a screen color temperature adjustment which automatically compensates for black and white or color reception.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. Throughout the specification, values will be given for certain of the components in order to disclose a complete, operative embodiment of the invention. However, it should be understood that such values are merely representative and are not critical unless specifically so stated.

Turning to FIG. 1, a drive stage 10 amplifies a signal from a conventional signal source 12 and drives a cathode 14 of a cathode ray tube (CRT) 16 of conventional construction. While a three gun color CRT is illustrated, the invention is equally usable in a solely black and white television receiver, and when so used, the CRT would be a conventional one gun picture tube. The tri-color CRT 16 includes a G1 grid and a G2 grid for controlling the intensity of electron beam current which reaches the picture screen from the gun or cathode 14.

When used in a color television receiver, the invention is adaptable for use with receivers of the type which matrix in source 12 the luminance and chrominance channels to develop pure R, G and B signals for coupling to the cathodes 14. In the remaining figures, the drive control circuit is described for a color television receiver but it will be appreciated that the drive control circuit is equally applicable with receivers for solely black and white reception.

Drive stage 10 includes an NPN transistor 18 having a base electrode **18*b* coupled to the signal source 12 which forward biases the base-emitter junction when the received television composite signals increase in strength in the white direction. A collector electrode 18*c* is coupled through a load resistor 20 to a source of positive potential, or +V, and is also directly coupled to the cathode 14. An emitter electrode 18*e* is coupled through a resistor 22, shunted by a capacitor 24, and a resistor 26 to a source of reference potential or ground 30. Resistor 26 is shunted by a drive control potentiometer 32, connected as a variable resistor, in series with a Zener diode 34. The anode of the Zener diode is connected to a junction 35 with potentiometer 32, and through a resistor 36 with a source of positive potential or B+. The G2 grid of the CRT 16 is coupled to the wiper of a potentiometer 40 connected in series between a conventional G2 supply source and ground 30.**

In operation, variable resistor 32 functions as a gain control by varying the degenerative emitter resistance of the transistor 18, thereby controlling the amount of current through transistor 18. This in turn controls the voltage drop across the load resistor 20, and hence the drive voltage coupled to the cathode 14. Junction 35 is maintained at a positive reference potential (which corresponds to the black level, as will appear) due to the constant voltage drop across the Zener diode 34. In some circuits, it may be desired that the reference black level at junction 35 be lower than that available from a Zener diode. In such a case, the Zener diode 34 can be replaced by one or a series of conventional semiconductor diode rectifiers, poled in the opposite direction.

Resistor 26 forms an alternate current path around the drive control 32. As the received television signal decreases in strength, the forward biasing of transistor 18 is decreased, resulting in a lesser current flow out of the emitter electrode 18e. Ultimately, the current flow drops to a point where the voltage at the junction between resistors 22, 26 and 32 equals the voltage at junction 35. As the signal level decreases beyond this point, current no longer flows through control 32 in the same direction as previously, but rather all of the emitter current flows through resistor 26 to ground 30. A slight current will flow from junction 35, through control 32 and resistor 26 to ground 30, raising slightly the voltage at emitter **18*e* due otherwise to the action of signal source 12. However, this reverse current flow path has no effect on the CRT 16,** since all such current flows are below the black level, as will appear.

The point at which the voltage at the junction of resistors 22, 26 and 32 equals the voltage at the junction 35 is selected as the black level for the television receiver. When this signal condition occurs (conveniently established by the set-up switch of FIG. 2), the wiper of potentiometer 40 is adjusted to establish the black level on the CRT screen. For received signals at and below the black level, the control 32 is effectively disconnected from the drive control circuit and loses control, i.e., has zero effect on signal gain. Regardless of the instant resistive impedance of potentiometer 32, and the resulting slope of the degenerative emitter resistance, the drive control circuit always reaches the same black reference potential, at which time the control 32 always is effectively removed from the circuit. Hence the black level remains constant for any given adjustment of the grid bias potentiometer 40.

The unique drive control circuit described above produces a number of advantages in addition to establishing a fixed black level regardless of the setting of the gain control. When the black level is reached, the level of current through transistor 18 is near but not at cut-off. Since most transistors have a nonlinear region near cut-off, the drive control circuit desirably allows the black level current to be chosen in a range above the nonlinear region of the drive transistor 18. Furthermore, the difference between the black level current and transistor cut-off serves as a safety factor which insures that the CRT screen can always be cut-off by adjustment of the G2 bias. This is particularly important in a color television receiver, in which the cut-off point of the output transistors in the three color channels may not be the same.

Turning to FIGS. 2A and 2B, the drive control circuit of FIG. 1 is illustrated in each of the three color or chroma channels of a color television receiver. To connect the figures, FIG. 2A should be placed above FIG. 2B, with the common lines between the figures being connected at the dashed lines. Elements corresponding in function to the elements of FIG. 1 have been identified by the same reference numeral, with the addition of an R, B, or G designation to indicate that the component is used in the red, blue, or green chroma channels, respectively. As previously mentioned, the signal sources 12 are formed by conventional color matrixes which develop pure R, G and B signals. The G1 grids are coupled to a known horizontal blanking circuit, not illustrated.

Each drive control 10 includes emitter resistor 22, as 68 ohms, bypassed by a 0.005 microfarad capacitor 24. The current shunting resistor 26, as 2.2 kilohms, is shunted by a 150 picofarad capacitor 50. Potentiometer 32G, as 300 ohms, is connected by a wire with a set-up switch 54. The switch 54 in turn is directly connected to the junction 35.

The drive control for the R channel is modified from that shown in FIG. 1, and includes an 82 ohm resistor 60 connected in series between a relative color (R/B) potentiometer 62, as 300 ohms, and the junction between resistors 22R and 26R. A single wiper element 64 of the relative color potentiometer 62 is directly connected to the set-up switch 54. The opposite, fixed resistor, end of potentiometer 62 is coupled through potentiometer 32B, as 300 ohms, to the junction between resistors 22B and 26B. During normal television reception, set-up switch 54 remains closed, and is only opened when establishing a desired black level, as will be explained.

Zener diode 34 establishes a 5.6 volt drop thereacross, so that junction point 35 has a constant 5.6 volt reference potential. Resistor 36 may have a value of 3.3 kilohms, connecting the Zener diode to a positive source, as +40 volts.

The potentiometer 62 forms an improved relative R/B control, sometimes known as a CHROMIX control. As the wiper 64 is moved towards the end of the fixed potentiometer resistance adjacent the R channel, the resistance path to reference junction 35 is reduced for the R channel, while the resistance path to junction 35 for the blue channel is correspondingly increased. Since potentiometer 62 also controls the degenerative emitter resistance of the transistors 18R and 18B, and hence the gain of drive stages 10R and 10B, it serves as a relative R/B color control in which relative color adjustment does not alter the black level for either the red or blue channels.

This occurs because the junction 35 connects the wiper 64 to a fixed black reference potential which does not alter regardless of the wiper setting for the potentiometer 62. This structure in cooperation with the action of the current bypass resistors 26R and 26B results in maintaining a constant black level current for the relative color control. While a single potentiometer 62 has been used to provide a pair of resistances having resistance values inversely controlled by a single common element, it will be apparent that a pair of separate variable resistors ganged to a single control knob could be substituted therefore. The ganging would increase one resistance value while it simultaneously decreased the other resistance value.

The collector circuit of each drive transistor 18 includes a 15 kilohm resistor 67 in shunt with a 560 microfarad inductor 68, in series between a damping resistor 72, as 22 kilohms, and the collector of the transistor 18. The damping resistor 72 shunts a 1,000 microhenry inductor 70, and is connected with a DC source, as +230 volts, through a 10 kilohm load resistor 20. The junction between resistors 20 and 67 is connected to the corresponding color gun or cathode 14 via a 220 ohm resistor 74 connected to the parallel combination of a 39 kilohm resistor 78 and a 330 microhenry inductor 79.

The G2 grids of CRT 16 are connected to the potentiometers 40, as 3 megohms, each coupled to ground 30 through a common 150 kilohm resistor 82. The wiper of each potentiometer 40 is bypassed to ground 30 through a 0.001 microfarad capacitor 84.

Set-up switch 54 allows the black level current in each drive stage 10 to be conveniently established by merely opening the switch. This open-circuits the ground return path for potentiometer 62 and potentiometers 32G and 32B, effectively removing or disconnecting the drive controls as occurs when the input signals from the sources 12 drop so that the voltage drop across resistor 26 is exactly equal to the voltage drop of the Zener diode 34. At this time, all current through the transistors 18 is bypassed around the drive controls through the bypass resistors 26. The television receiver is then set to receive no input signal. The G2 potentiometers 40 may now be individually adjusted so as to cut-off the beam current for the corresponding color gun. With this improved set-up circuit, the black level may be conveniently established without changing the instantaneous settings of the gain controls.

In FIG. 3, an automatic color temperature adjustment circuit is illustrated as incorporated in the novel drive control circuits of the type previously described. For clarity, the drive control circuit 10 for each color channel is only partially illustrated. When reception changes from black and white to color, it is known that the color screen temperature should shift from a P–4 color to illuminant C. Prior circuits do not produce this result by changing the drive to the color guns, as illustrated, but rather change the cut-off point as by changing grid bias, thereby undesirably shifting the black level.

The circuit of FIG. 3 overcomes the difficulties with prior automatic temperature controls. The direction of color warming to go from a P–4 color to illuminant C is approximately equal increases in R current and a decrease in B current. However, this can be approximately accomplished by adding 10 percent more R drive and 5 percent more G drive. As seen in FIG. 3, the emitter of transistor 18R is coupled through a resistor 100 to the collector of an NPN transistor 102 having its emitter coupled to the reference junction 35. The emitter of transistor 18G is coupled through a resistor 104 to the collector of transistor 102. Resistors 100 and 104 are chosen to be large compared with resistors 22 and 26. Desirably, the resistance value of resistor 100 is approximately 10 times the sum of the resistance of resistors 22R and 32R, and the resistance value of resistor 104 is approximately 20 times the sum of the resistance of resistors 22G and 32G.

The base of transistor 102 is coupled to an output line 110 of a conventional color killer 112 which produces a positive output voltage on line 110 when color is being received, and either a zero voltage or a negative voltage on output line 110 when black and white is being received.

In operation, the transistor 102 is cut-off during monochrome or black and white reception. The voltages at the emitters of the transistors 18R and 18G are approximately equal at this time, and hence no current flows through the resistors 100 and 104. During color reception, a positive voltage on line 110 switches transistor 102 into saturation. The current paths through resistor 100 to reference junction 35 now increases the current through the transistor 18R, increasing the voltage to the red gun of the CRT. Similarly, the current path through resistor 104 to junction 35 increases current flow by about one-half as compared to resistor 100, and hence increases the voltage to the green gun of the CRT. This results in the desired color warming of the CRT screen. Because the automatic color temperature control is connected to the reference establishing circuit in a drive control of the FIG. 1 type, the black level for the CRT remains constant.

I claim:

1. In a television receiver including a drive amplifier having a variable gain dependent upon the adjustment of means for producing a variable impedance, the improvement comprising: circuit means for coupling said variable means in circuit to control the gain of said drive amplifier in proportion to the adjustment of said variable means; and means for establishing a fixed reference potential regardless of the adjustment of said variable means by effectively disconnecting said variable means from said circuit when a drive signal has a value equal to a predetermined value.

2. The improvement of claim 1 for a television receiver including a display device having a drive element coupled to said drive amplifier and a control element for controlling the intensity of display, including cut-off means coupled to said control element for selecting a black level within a range of signals from said drive amplifier, said cut-off means being adjusted to select said black level when said drive signal has said predetermined value, whereby said fixed reference level corresponds to a black reference level.

3. The improvement of claim 2 wherein said reference establishing means includes switch means for disconnecting said variable means from said circuit, thereby establishing the black reference level during a set-up mode.

4. The improvement of claim 1 wherein said reference establishing means includes a constant voltage source for generating a constant voltage, said circuit means couples said variable means in series with said constant voltage source to cause current flow in one direction through said variable means for drive signals above said predetermined value, drive signals below said predetermined value causing current to flow in an opposite direction.

5. The improvement of claim 4 wherein said circuit means includes impedance means connected in shunt with said series connected variable means and constant voltage source to form an alternate current path for said drive amplifier when current flows in said opposite direction through said variable means.

6. The improvement of claim 5 wherein the drive amplifier includes a semiconductor amplifying device having a pair of output electrodes and a control electrode, signal source means coupled to said control electrode for biasing said semiconductor device in proportion to a received television signal, said circuit means connecting in series said variable means, said constant voltage source and said output electrodes so that the impedance of said variable means controls the degenerative gain of said semiconductor device.

7. The improvement of claim 6 wherein said signal source biases said semiconductor device above cut-off when the current through the semiconductor device produces a drive signal voltage at a junction in the series connected circuit means equal to said constant voltage, whereby said constant voltage corresponds to said predetermined value.

8. The improvement of claim 4 wherein said constant voltage source comprises resistance means and Zener diode means connected in series across a DC potential source, the junction between said resistance means and the Zener diode means being DC coupled to said variable means.

9. In a color television receiver including first and second drive amplifiers for first and second color channels, respectively, the improvement comprising: first variable impedance means coupled with said first drive amplifier to control the gain thereof and vary the amplitude of a first drive signal at a first junction in proportion to the impedance of the first variable impedance means; second variable impedance means coupled with said second drive amplifier to control the gain thereof and vary the amplitude of a second drive signal at a second junction in proportion to the impedance of the second variable impedance means; reference means for producing a constant voltage; and means connecting said first and second variable impedance means to said reference means for causing each variable impedance means to have no control over the gain of the drive amplifier associated therewith when the amplitudes of the drive signal at the associated junction is less than the amplitude of said constant voltage.

10. The improvement of claim 9 wherein said connecting means includes first shunt impedance means connected to bypass current around said first variable impedance means and second shunt impedance means connected to bypass current around said second variable impedance means, and circuit means for effectively disconnecting said first and second variable impedance means from said drive amplifiers when said drive signals are equal to said constant voltage, whereby the currents through the drive amplifiers flow through said shunt impedance means.

11. The improvement of claim 9 including color temperature adjustment means comprising a first means forming a current path from said first variable impedance means to said reference means and effective when enabled for changing the gain of the first drive amplifier, a second means forming a current path from said second variable impedance means to said reference means and effective when enabled for changing the gain of said second drive amplifier, and gate means for enabling said first and second means.

12. The improvement of claim 11 for a color television receiver including a display device having a pair of drive elements coupled to said first and second drive amplifiers and control element means for controlling the intensity of display, cut-off means coupled to said control element means for selecting a black level for different levels of signals from the drive amplifiers, said cut-off means being adjusted to select said black level when said drive signals equal said constant voltage.

13. The improvement of claim 11 wherein said gate means comprises semiconductor means forward biased into conduction to enable said first and second means, and color killer means effective when only a black and white or only a color signal is being received for forward biasing said semiconductor means.

14. The improvement of claim 11 for a color television receiver wherein said first drive amplifier corresponds to a red color channel and said second drive amplifier corresponds to a green color channel, said first means having an impedance lower than said second means to increase the red drive output of said first drive amplifier more than the green drive output of said second drive amplifier to cause the color screen temperature to warm for color reception.

15. The improvement of claim 9 wherein said first variable impedance means comprises a potentiometer having a wiper adjustable across a fixed resistance, and relative color means connecting one end of said fixed resistance with said first drive amplifier to control the gain thereof in proportion to the resistance between said wiper and said one end and connecting the other end of said fixed resistance with said second drive amplifier to control the gain thereof in proportion to the resistance between said wiper and said other end.

16. The improvement of claim 9 wherein said connecting means includes switch means connected between said reference means and said first and second variable impedance means for disconnecting the variable impedance means from said reference means during a set-up mode, and alternate current path means connected to said first and second drive amplifiers for shunting current when said first and second variable impedance means are disconnected from said reference means.

17. In a color television receiver including drive amplifiers in first, second and third color channels for driving a tri-color display device having grid means for controlling the intensity of the resulting color display, the improvement comprising: variable means having a single variable element adjustable for inversely controlling a pair of impedance means to cause a relative increase or decrease in impedance in one impedance means and a relative decrease or increase in impedance in the other impedance means, respectively; relative color means connecting said one impedance means in said first color channel to control the gain of the associated drive amplifier in proportion to its impedance and connecting said other impedance means in said second color channel to control the gain of the associated drive amplifier in proportion to its impedance; third color means for controlling the gain of the drive amplifier in the third color channel; and black level means connected to bias said grid means for cutting off the display to establish a black level.

18. The improvement of claim 17 wherein said relative color means includes means for effectively disconnecting said variable means from control of the gain of said first and second color channels for a signal level of a predetermined constant value, said black level means adjusting the bias on said grid means to establish said black level when said signal levels equal said constant value.

19. The improvement of claim 18 wherein said effectively disconnecting means comprises constant voltage means for generating a constant voltage corresponding to said predetermined constant value, means connecting said variable means in series with said constant voltage means, and alternate current path means shunting said variable means to allow continued current flow through said drive amplifiers when said signal levels are below said constant voltage.

20. The improvement of claim 19 wherein said effectively disconnecting means includes set-up switch means connected in series between said constant voltage means and said variable means for creating an open-circuit to simulate the effect of signal levels equal to said constant voltage.

21. The improvement of claim 17 wherein said third color means comprises second variable means having a variable control element adjustable to proportionately control an adjustable impedance, and gain means connecting said adjustable impedance in said third color channel for controlling the gain of the associated drive amplifier in proportion to the impedance of said adjustable impedance.

22. The improvement of claim 21 including third variable means having a single variable element adjustable to proportionately control a variable impedance, and supplemental gain means connecting the variable impedance of said third variable means in said first color channel for controlling the gain of the associated drive amplifier in addition to the relative color means.

* * * * *